(12) United States Patent
Theimer et al.

(10) Patent No.: US 6,321,199 B1
(45) Date of Patent: Nov. 20, 2001

(54) METHOD FOR ACOUSTICALLY CONTROLLING AN ELECTRONIC DEVICE, IN PARTICULAR A MOBILE STATION IN A MOBILE RADIO NETWORK

(75) Inventors: Wolfgang Theimer; Udo Gortz; Ari Salomaki, all of Bochum (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/290,965

(22) Filed: Apr. 13, 1999

(30) Foreign Application Priority Data

Apr. 16, 1998 (DE) .............................. 198 16 933

(51) Int. Cl.[7] .......................... G10L 15/22; H04M 1/00; G06F 3/16
(52) U.S. Cl. ................. 704/275; 379/88.01; 381/110
(58) Field of Search ................ 704/275; 381/110; 379/88.03, 88.01

(56) References Cited

U.S. PATENT DOCUMENTS

| | | | |
|---|---|---|---|
| 3,988,680 | * 10/1976 | Kolm | 455/153.1 |
| 4,081,840 | * 3/1978 | Kolm | 455/353 |
| 5,287,102 | * 2/1994 | McKiel, Jr. | 340/825.19 |
| 5,479,476 | 12/1995 | Finke-Anlauff | 379/58 |
| 5,493,618 | * 2/1996 | Stevens et al. | 381/110 |
| 5,640,485 | 6/1997 | Ranta | 395/2.6 |
| 5,774,862 | * 6/1998 | Ho | 704/275 |
| 5,812,954 | 9/1998 | Henriksson | 455/550 |
| 5,819,175 | 10/1998 | Niemi | 455/418 |
| 5,864,603 | 1/1999 | Haavisto et al. | 379/88 |
| 5,892,475 | 4/1999 | Palatsi | 345/352 |

FOREIGN PATENT DOCUMENTS

| | | |
|---|---|---|
| 0 493 295 A2 | 7/1992 | (EP) . |
| 2 165 974 A | 4/1986 | (GB) . |

* cited by examiner

*Primary Examiner*—Tālivaldis Ivars Šmits
(74) *Attorney, Agent, or Firm*—Perman & Green, LLP

(57) ABSTRACT

The invention relates to a method for controlling an electronic device, in particular a mobile station in a mobile radio network. In order to allow simple and flexible control, the invention provides that a sound is varied in order to select from a plurality of predetermined options.

17 Claims, 5 Drawing Sheets

Figure 1:
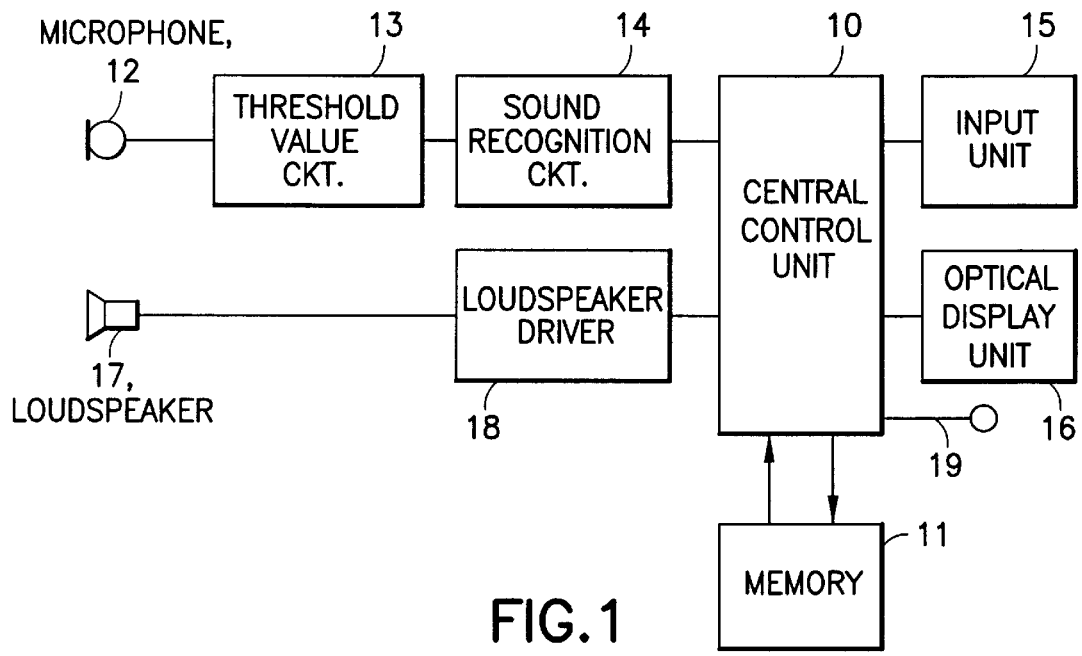

METHOD FOR ACOUSTICALLY CONTROLLING AN ELECTRONIC DEVICE, IN PARTICULAR A MOBILE STATION IN A MOBILE RADIO NETWORK

The invention relates to a method for controlling an electronic device, in particular a mobile station in a mobile radio network.

Electronic devices such as personal computers (PC) are normally controlled by inputting commands via a keyboard or by selecting commands from appropriate menus using a mouse. Furthermore, PC control programs which react to acoustic voice commands already exist.

In order to control a computer using voice commands, it is in this case necessary for the acoustic input device to have a voice recognition unit which preferably has a learning capability, analyses the spoken words and compares them with the stored voice commands, in order to cause the corresponding command to be executed if a spoken word matches a stored voice command.

This known use of voice commands to control a PC admittedly has the advantage that the user's hands are in this case free for other tasks, but requires that he know the desired commands exactly. The search for a command that is unknown but whose nature is supposed is frequently carried out, for example, using a mouse, but is virtually impossible with voice commands.

In the case of fixed telephone networks, it is also known for the individual digits from 0 to 9 to be allocated tones using the DTMF (Dual Tone Multi Frequency) method, in order to transmit the dialled telephone number as a corresponding sequence of frequencies when dialling a telephone number.

The allocation of digits to frequencies is also used, for example, for remote interrogation of telephone answering machines, in order to transmit appropriate digit codes via the fixed-installed telephone lines.

The production of the individual frequencies for the tone dialling method and remote interrogation of telephone answering machines are normally carried out by appropriate frequency generators, which must in turn be operated via an appropriate keypad.

In the case of mobile stations in a mobile radio network, that is to say in the case of mobile telephones, operation is normally carried out via the telephone keypad and appropriate additional function keys. Mobile telephones in this case have only limited space for arranging additional control keys, so that additional functions, which could be integrated without any problems as the miniaturization of the electronic components progresses further, can be provided only with difficulty.

Using an acoustic command input, it would be possible to provide a remedy for this, in order to provide additional functions, improving user-friendliness, in a mobile telephone.

In vehicle navigation systems as well, the selection of destination addresses, that is to say the area, road, house number and possibly the selection of navigation information, that is to say the selection of possible alternative routes, such as motorways or motorway sections, could also be simplified by acoustic control.

With this in mind, the invention is based on the object of providing a method for controlling an electronic device, in particular a mobile station in a mobile radio network, to give a user the capability to carry out acoustic control in a simple manner, using his voice.

The invention thus provides that, in order to control an electronic device or a mobile telephone, a sound is varied in order to select from a plurality of predetermined options. The predetermined options may in this case be individual control commands from a user menu, individual data records from stored lists, such as from a telephone directory, or the individual values of continuously variable parameters.

Thus, in the case of the method according to the invention, a user can select from a list of options or can set a continuous parameter by variation of a sound produced by his voice, in the same way as using a rolling bar or scroll bar.

The method according to the invention can be used in mobile telephones, for example, in order to use a list of names to select from a telephone directory for dialling a telephone number of someone with whom one wishes to speak, so that the appropriate telephone number can then be dialled.

Alternatively, the method according to the invention can also be used, for example, for remote control of broadcast radio or television sets in order, for example, to select a programme or to set the reproduction volume.

In a preferred refinement, the invention provides that the predetermined options are sequentially assigned to an adjustable frequency range between a lowest frequency and a highest frequency, and that the frequency of the sound is varied in the set frequency range. As an alternative or in addition to this, it is expedient for the predetermined options to be assigned to different tonal qualities, and for the tonal quality of the sound to be varied.

One specific refinement of the invention is distinguished by the fact that various groups of predetermined options are assigned to different tonal qualities, while the individual options in each group are assigned to individual frequencies in a set frequency range, and that a group of predetermined options is first selected by varying the tonal quality, and the frequency of the sound is then varied in order to select an option from the selected group.

In the situation where the intention is to select only one item from a single list of options, that is to say for example a data record or a control command from a corresponding list of data or commands, or where only a single parameter is to be set, the variation of the frequency is particularly appropriate, since it is normally very easy for a user to deliberately vary the frequency with his voice. The variation of the tonal quality of a sound produced by the voice is particularly expedient when a selection among only a few options is to be made. If, for example, only individual control commands are intended to be selected, then it is feasible to allocate the tonal quality of a vowel sound to each control command. If there are more than eight selection options, it is admittedly still possible to carry out a selection by varying the tonal quality of the sound by articulating intermediate tonal qualities between the vowel sounds, but frequency variation is preferable in this case.

Variation of both the frequency and the tonal quality of a sound produced by the human voice opens up the possibility for a two-dimensional search in that, for example, the tonal quality is used first of all to select one of a number of lists or one of a number of parameters, before then selecting a specific option from the list or setting a specific parameter value by varying the frequency.

In order to provide real two-dimensionality in the selection of an option from a large number of two-dimensionally structured options, as is possible, for example, using a conventional computer mouse, the invention provides for the tonal quality and the frequency of the sound to be varied at the same time in order to select one option from a plurality of two-dimensional options.

Varying the tonal quality and frequency of a sound at the same time makes it possible for a user, in particular a practised user, to access the option to be selected acoustically and immediately without first of all having to vary the tonal quality to search in one direction, and then vary the frequency to search in the other direction.

For practical application, the invention provides that the predetermined options are control commands, which are combined in groups into menus and/or that the predetermined options are data which are stored in list form.

Particularly in the case of remote control of an electronic appliance in which one or more parameters can be set, it is advantageous if the options to be selected are formed by adjustable and selectable values of the parameter or parameters for operation of the electronic device. This development of the invention is expedient in particular when a plurality of parameters have to be set by the user more or less at the same time when using or handling the electronic appliance, while he is handling a tool supplied by the electronic appliance and thus has no hands free for the setting operation. In this case, the method according to the invention, which uses the variation of a sound, has the advantage over methods which operate by voice commands that parameter setting by sound variation is not erroneously interpreted as an instruction to an assistant, as could occur when using voice commands for control purposes.

In order to allow the user to monitor his selection, an expedient refinement of the invention provides that successful selection of an option is confirmed by the electronic switching device repeating the sound which defines the selection, in which case, when the selection is confirmed, the set frequency and/or tonal quality range are/is indicated by sounds or frequencies corresponding to their limit values, in addition to the confirmation sound. In order to improve the operational reliability further, the invention provides that successful selection is confirmed by indicating or announcing the selected option.

In order to select one option, for example a name with the associated telephone number, from a large number of options, for example from an extensive telephone directory, the invention provides that first of all, a group of individual options is selected from a large number of options by sound variation, and that the desired option is then selected on the basis of the selected group of options. This two-stage selection, in which a specific list range or parameter range is selected first of all, and this can then be enlarged for the second selection in a similar way to using a magnifying glass, has the advantage that the selection can be carried out very quickly and nevertheless with high accuracy since only relatively few options are now assigned to the entire sound variation range for the second selection step.

In this case, it is also possible for the selection of the desired option to be carried out manually on the basis of the preselected group of options. The combination of acoustic and manual selection of an option from a list of options allows the method according to the invention to be implemented in a particularly simple manner and, furthermore, offers a high level of user-friendliness, since the method according to the invention can be reliably used in combination with manual searching even in a relatively noisy environment.

An expedient development of the invention is distinguished by the fact that in order to recognize a selection, the acoustic power is first of all detected and is compared with a reference value in order to recognize a sound as such, and that, after a sound has been recognized, its frequency and/or its tonal quality is defined, in order then to indicate or to announce the associated option as a function of this. In this case, it is advantageous if the frequency and/or the tonal quality of the sound are/is detected continuously, in order to display the predetermined options sequentially in accordance with the frequency change or tonal response change, or to cause them to be indicated.

To make it possible for any user to be able to use the variation scope of his voice optimally, a particularly preferred refinement of the invention is distinguished by the fact that the frequency and/or tonal quality range is adjustable individually for each user.

Figure 6:
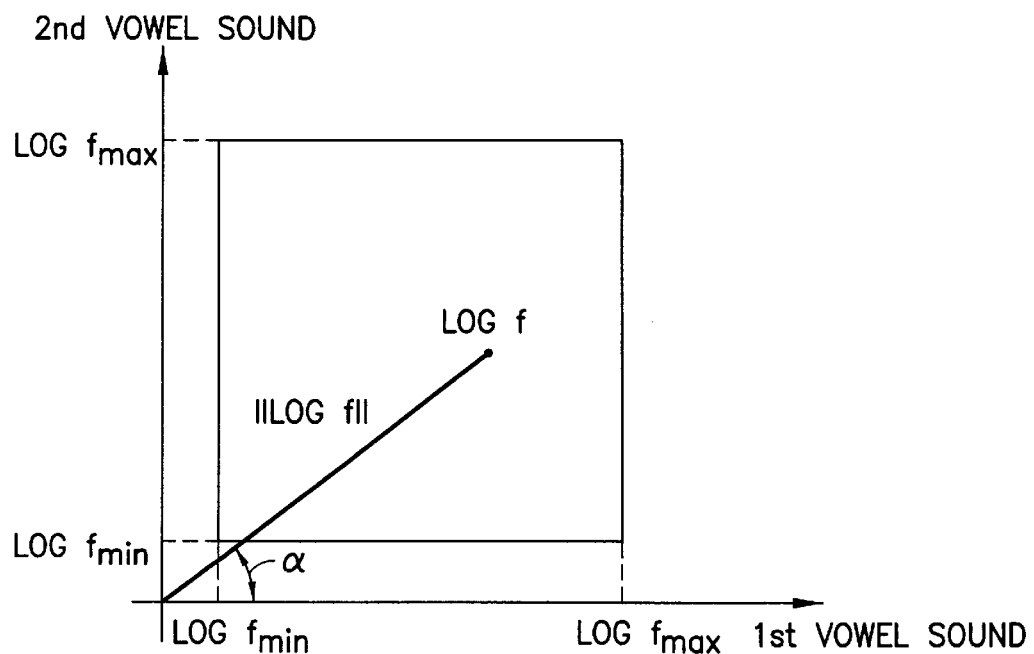
Figure 2:
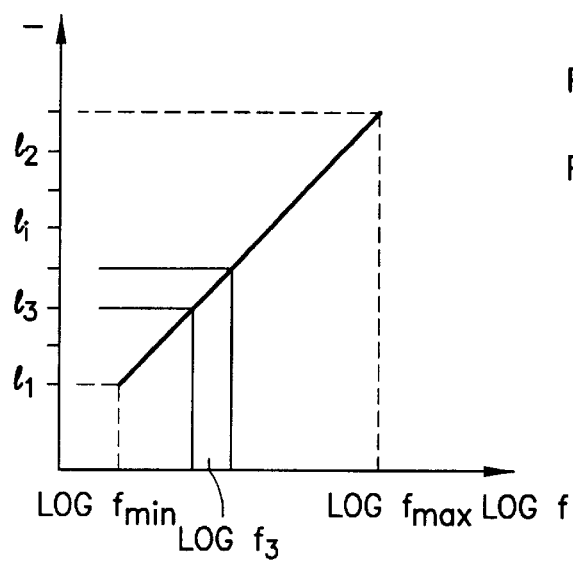
Figure 3:
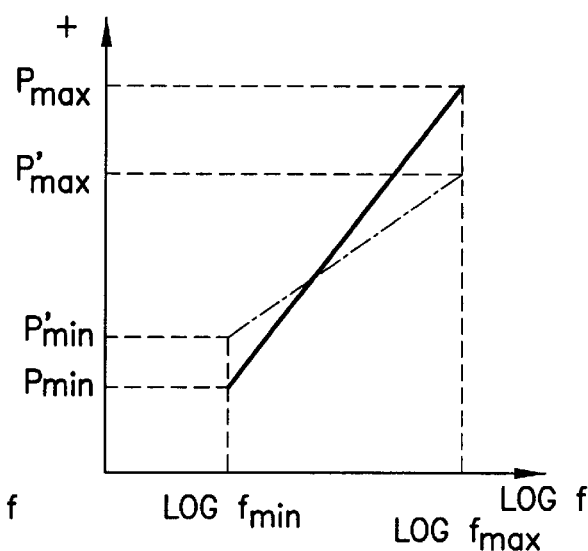
Figure 4:
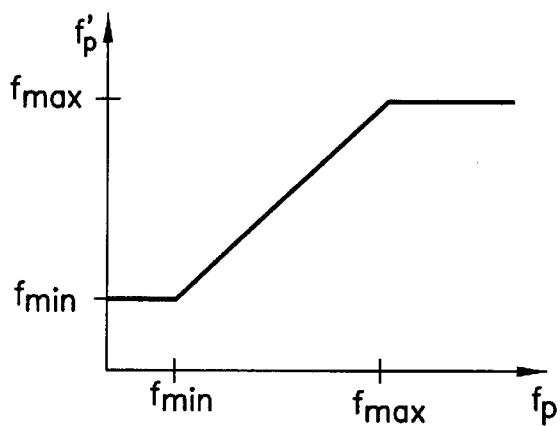
Figure 5:
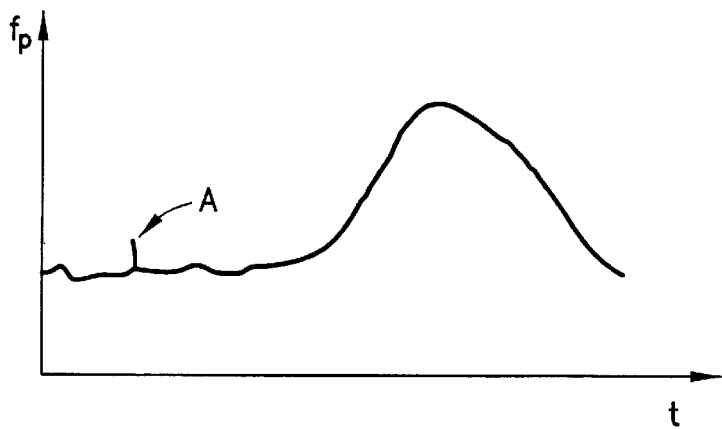
Figure 7:
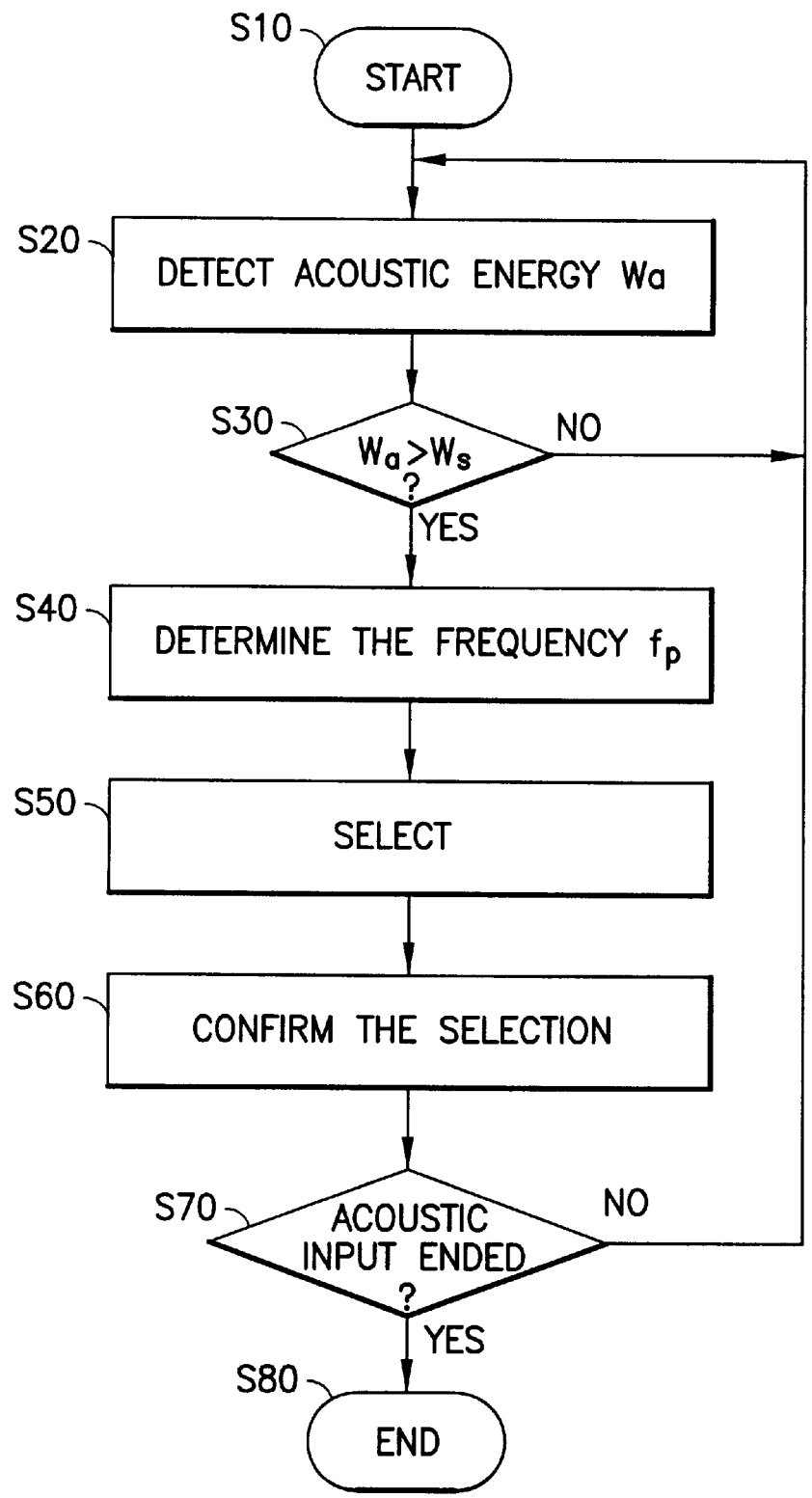
Figure 8:
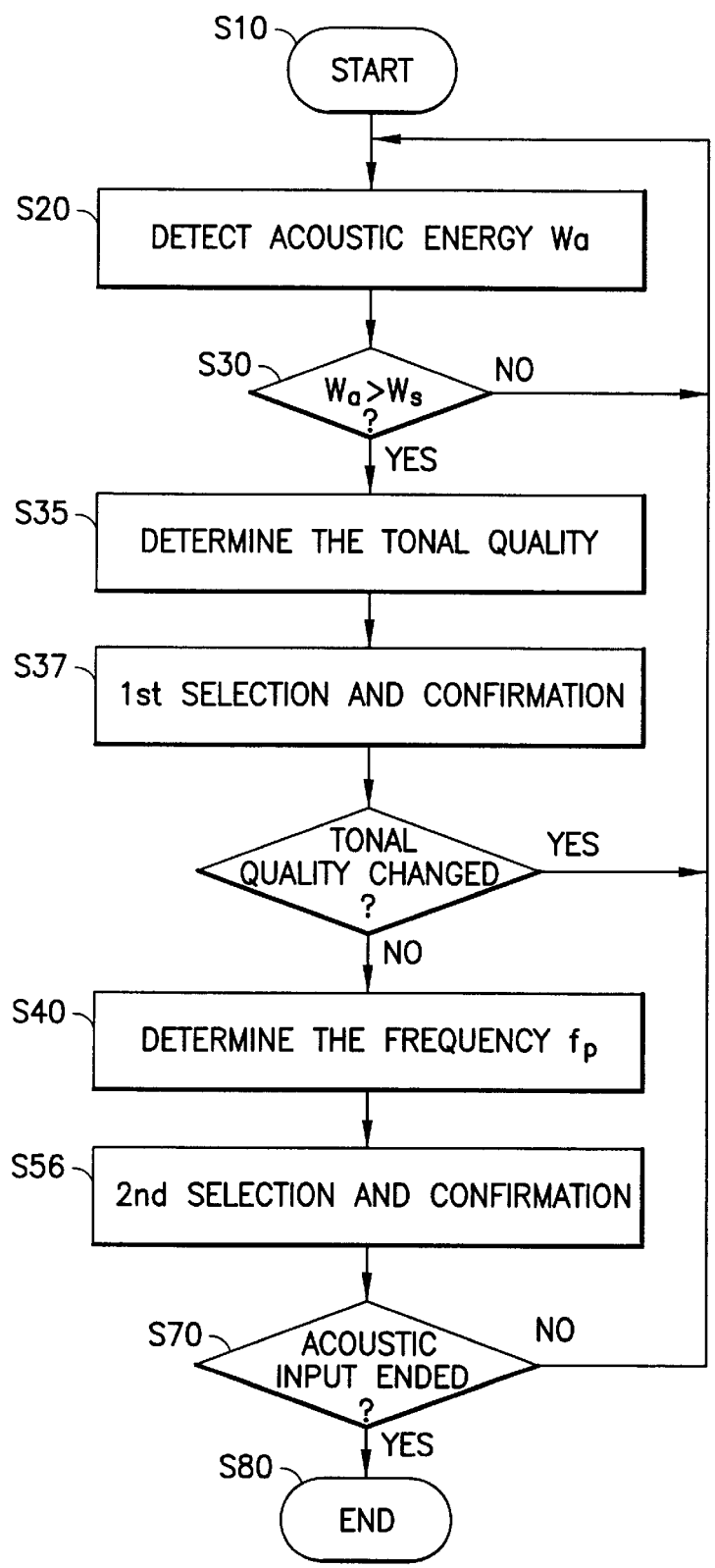
Figure 9:
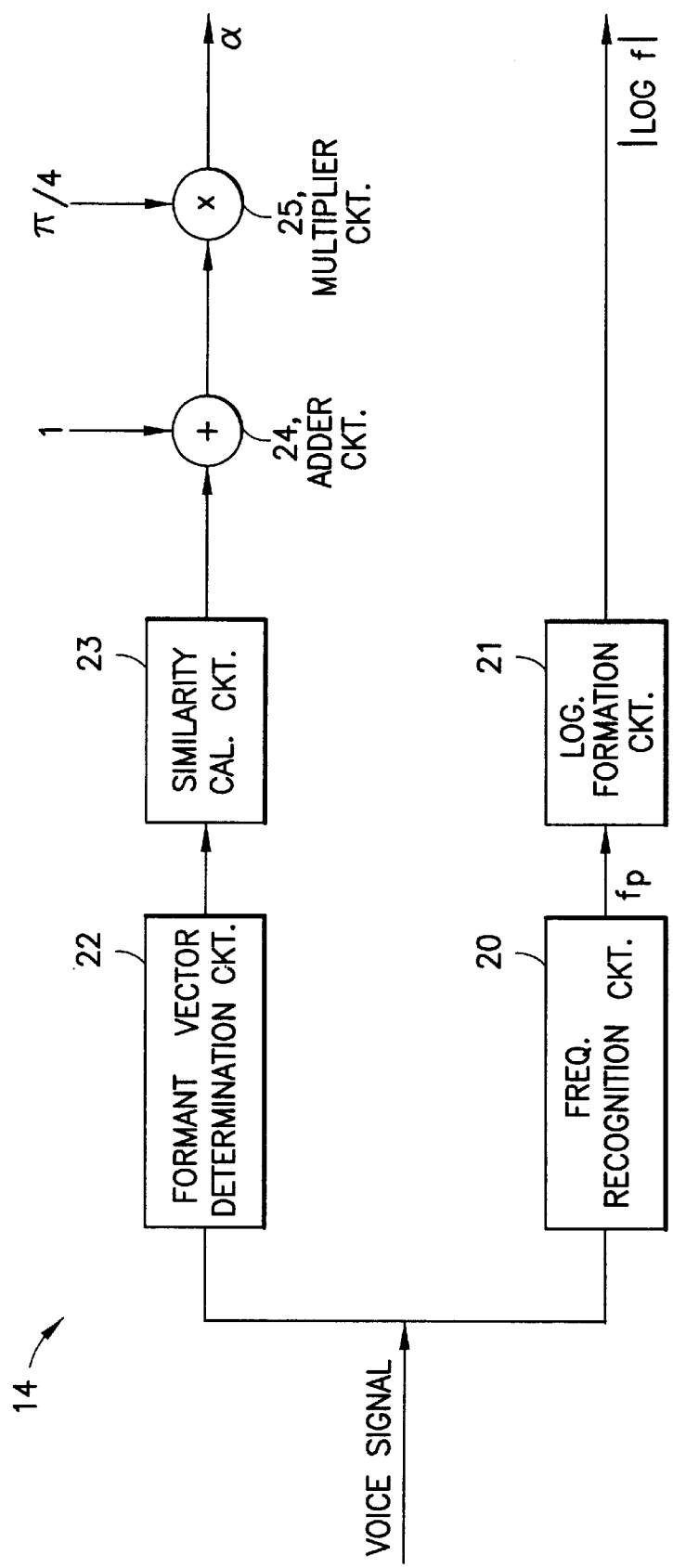

The invention is explained in more detail in the following text with reference, by way of example, to the drawing, in which:

FIG. 1 shows a highly simplified schematic block diagram of an electronic device for carrying out the method according to the invention, FIG. 2 shows a diagram to explain the association of individual data items in a list with a frequency range, FIG. 3 shows a diagram to explain the association of individual parameter values with a frequency range, FIG. 4 shows a frequency/frequency graph to explain frequency filtering on the basis of a set frequency range, FIG. 5 shows a frequency/time graph to illustrate one possible frequency response for selection of an option, FIG. 6 shows a diagram to explain two-dimensional selection, FIG. 7 shows a simplified flowchart of a first method according to the invention for controlling an electronic device, FIG. 8 shows a simplified flowchart of a further method according to the invention, and FIG. 9 shows a simplified schematic block diagram of a circuit for defining a frequency vector for two-dimensional selection.

Mutually corresponding elements in the various figures have the same reference characters.

An electronic device for carrying out the method according to the invention has, as is shown in FIG. 1, a central control unit 10, for example a microprocessor or the like, with which a memory 11 is associated. A microphone 12 is connected to the central control unit 10, as an acoustic input apparatus, via a threshold value circuit 13 and a sound recognition circuit 14. The sound recognition circuit 14 in this case comprises, in a manner which is not illustrated in any more detail, a frequency detection circuit for identifying the frequency of a detected sound and/or a tonal quality characteristic detection circuit for identifying the tonal quality of a detected sound. In addition, a conventional input unit 15, for example a keypad or a mouse, is expediently connected to the control unit 10.

In order to output data and signals, an optical display unit 16 is provided on the one hand, and may be, in a known manner, a liquid crystal display or a light-emitting diode display. On the other hand, a loudspeaker 17 is provided as the acoustic output unit, and can be driven from the central control unit 10 via an appropriate loudspeaker driver 18.

In order to make it possible to search through an organized list of options, for example an alphabetically organized list of names with associated telephone numbers or the like or a list of control commands, with the aid of the method according to the invention and in a manner corresponding to a scroll bar or roller bar in order to select one of the predetermined options, it is necessary for the variation range of a variable characteristic of the sound to be assigned in a defined manner to the predetermined options in the list. The assignment of the individual options in a list to the frequency f is explained in the following text with reference to FIG. 2.

In order first of all to define a possible frequency range, the user sings the lowest and highest frequency which he can sing without straining. The frequency $f_{max}$ of the highest tone and the frequency $f_{min}$ of the lowest tone in this case define the available frequency range, to which the predetermined options $l_1, l_2 \ldots l_i, \ldots l_n$ in the organized list L are to be uniquely assigned. As FIG. 2 shows, the individual options $l_i$ are assigned to a logarithmic frequency scale log f, which is split into individual sections corresponding to the number n of predetermined options. Each individual option $l_i$ is in this case assigned the mean log of the frequency of the corresponding section. The option $l_3$ is thus assigned the third section of the log of the frequency range, so that the third option $l_3$ is represented by the mean log of the frequency log $f_3$.

If the predetermined options are the values of a setting range of a specific parameter p, then the assignment of the continuous or virtually continuous parameter values is carried out in a manner corresponding to that illustrated in FIG. 3. The lowest and highest log of the frequency log $f_{min}$ and log $f_{max}$, respectively, are assigned linearly to the lowest and the highest parameter value $P_{min}$, $P'_{min}$ and $P_{max}$, $P'_{max}$, respectively, in the respective setting range.

As soon as the frequency range available to the user has been assigned, the selection can be made using the method according to the invention.

As shown in FIG. 7, after the start (step S10), the step S20 compares the acoustic energy Wa detected by the microphone 12 with a threshold value Ws, in a threshold value circuit 13, in order to recognize a sound in a general noise level. In this case, the user may be able to set the threshold value Ws to a fixed value. Alternatively, it is feasible for the threshold value to be automatically adapted to a noise level, which reliably prevents incorrect setting by the user.

If it is found in the step S30 that the detected acoustic energy Wa does not exceed the threshold value Ws, then the method returns to the step S20 and continues to detect the acoustic energy. As soon as a sound sung by the user is detected, the step S30 determines that its acoustic energy Wa is greater than the threshold value Ws, and the received signal is passed on from the threshold value circuit 13 to the sound recognition circuit, which determines the frequency as the frequency $f_p$, in the step S40.

The frequency of a sound is determined, for example, using the so-called SIFT (Simplified Inverse Filter Tracking) algorithm, which is particularly highly suitable for relatively high female voices, while the so-called Cepstrum pitch estimation method is used for relatively low male voices. These methods are well known by the responsible person skilled in the art and are explained, for example, in the text book "Voice and Speech Processing", Thomas W. Parsons, New York, 1986, McGraw-Hill Book Company.

The determined pitch frequency $f_p$ is supplied in a suitable form to the control unit 10, which selects the associated option $l_i$ or the corresponding parameter value. The frequency signal $f_p$ supplied from the sound recognition circuit 14 is digitized, if it is not already in digital form, and is then subjected to filtering in accordance with FIG. 4, in which an input frequency f below or above the set frequency range $f_{min}$ to $f_{max}$ is set to the lowest or highest frequency $f_{min}$ or $f_{max}$, respectively, in the frequency range. After its logarithm has been taken, the pitch frequency $f_p$ filtered in this way then makes it possible to make a unique selection of an option $l_i$, p ($f_p$) from a large number of predetermined options, in the step S50. After selection of the option $l_i$, p ($f_p$), the selection is confirmed in the step S60. The confirmation is in this case provided, for example, in such a manner that the recognized frequency is output from the control unit 10, via the loudspeaker driver 18 and the loudspeaker 17. In this case, it is expedient if the relative frequency of the recognized frequency of the sound is at the same time also indicated acoustically by reproducing the highest and lowest frequency in the set frequency range.

Another or additional option for confirming the selection is for the selected option to be displayed on the visual display unit 16. If the selection that has been made is confirmed visually in this way, it is particularly expedient for the recognized frequency to be output at the same time, so that the user knows the frequency from which he must sing a higher or lower frequency in order to make a desired selection which is located behind or in front of the actually selected option on the basis of the predetermined order.

Furthermore, particularly if the predetermined options are names or control commands, the selected name or the selected control command may be announced via the loudspeaker 17 as confirmation of the selection.

As soon as the selection has been confirmed in the step S60, the step S70 checks whether the acoustic input has ended. If this is the case, the selected option is provided for further control purposes, and the described method is ended in the step S80. If not, when a sound is next detected in the steps S20, S30, its frequency is identified in the step S40 in order to make the selection once again on the basis of the changed sound.

If, for example, the selected option is a name in a telephone list, then the selection that has been made can be used as the basis for dialling the associated telephone number in response to a manual or acoustic start signal. On the other hand, if the selected option is a control command for another electronic device, for example for a PC, then this command can be executed either directly or after appropriate confirmation by the user. If it is a selected parameter value then this can be passed on, for example via a control output 19 of the control unit 10, to the appropriate device, for setting.

In order to make it possible actually to scroll through an organized list or through corresponding parameter values acoustically, the frequency $f_p$ is determined at short intervals, to identify whether the frequency is rising, falling or has remained constant. The list of predetermined options is scrolled through for search purposes in a corresponding manner by indicating the individual options in a rising or falling sequence, sequentially, corresponding to the rising or falling frequency.

Brief spurious results as shown at A in FIG. 5 are suppressed, for example, by suitable low-pass filtering, non-linear median filtering or other smoothing methods.

If a number of lists and/or parameters are available, from which individual options or parameter values are intended to be selected, then it is possible to assign to the individual lists a sound characteristic which can be varied with the human voice, for example the tonal quality, and to assign to the individual options in each list, as described above, another variable sound characteristic, specifically the frequency. Although it is also feasible to vary the frequency for selection of the lists, in order then to vary the tonal quality of a sound in order to select an option from the selected list, it is expedient to use the tonal quality, as described, to select the lists.

If the number of lists and/or parameters is small, that is to say, for example, if the number is $\leq 8$, each list or each parameter can be assigned a vowel sound, or a variation of a vowel sound.

Thus, in order first of all to select from a plurality of lists and/or parameters one list or one parameter and then to select one option or one parameter value from this list or from this parameter, the acoustic energy Wa is first of all once again detected, as shown in FIG. 8, after the start of the method in the step S10, in order to identify, by comparing the acoustic energy Wa with a threshold Ws in the step S30, whether a sound is present. If this is the case, then the tonal quality of the sound is determined in the step S35, and the corresponding selection from the list as well as the confirmation are carried out in the step S37. The step S38 then identifies whether the tonal quality of the sound has changed again. If this is the case, the determination of the tonal quality is continued after once again detecting the acoustic energy level, in order once again to select a list, and to confirm this selection. If the tonal quality is no longer changing, then the step S40 determines, as already described above, the pitch frequency $f_p$ in order then, in the step S56, to make the selection from the list or the parameter values, and to confirm this selection.

In the case of this two-dimensional selection, which has been described in its simplest form here, it is also possible to change the tonal quality of the sound once again after changing the frequency, so that it is possible to move backwards and forwards between the individual lists and/or parameters, as is also possible using a mouse which can physically be seen.

In order to produce a real, two-dimensional acoustic mouse, using which two parameters can be selected at the same time, a first vowel sound is assigned to the one parameter, and a second vowel sound to the other parameter. Then, as shown in FIG. 6, each vowel sound is assigned a frequency range to which a required parameter range corresponds. A parameter vector $p=(p_1, P_2)$ corresponds to each vector log f, where $P_{1, min} \leq P_1 \leq P_{1, max}$ and $P_{2, min} \leq P_2 \leq P_{2, max}$. The frequency vector log f within the permissible quadrilateral is obtained by mixing the two vowel sounds. In this case, the magnitude |log f| of the vector is given by the frequency $f_p$ of the sound, and the angle α of the vector is given by the similarity of the formant frequencies of the sound with those of the first and second vowels. By changing the frequency $f_p$ and by altering the tonal quality from one vowel sound to another, any point in the permissible quadrilateral can be selected acoustically, so that the corresponding parameter pair can also be selected in this way.

In order to determine the similarity of the tonal quality of the current sound with the two vowel sounds, the sound is characterized, for example, by a formant vector F. The term formant means the resonant frequencies of the human vocal tract when using the voice to utter a sound. The first N formants of the sound, that is to say the lowest resonant frequencies, typically the first three, are considered. In a corresponding manner, the two vowel sounds are characterized by formant vectors $F_1$ and $F_2$, which likewise take account of the first N formants, typically the first N=3 formants once again.

The similarity S can then be calculated as follows:

$$S = \frac{|F - F_1| - |F - F_2|}{|F - F_1| + |F - F_2|} \quad (1)$$

In the situation where the current sound is equivalent to the first vowel sound, then $F=F_1$ so that $S=-1$. A corresponding situation results for a sound which corresponds to the second vowel sound, where $F=F_2$ and the similarity is $S=1$. If the current sound is between the vowel sounds, then a value of between −1 and +1 results for the similarity.

Thus, in order to produce a real, two-dimensional acoustic mouse, only voice sounds are used, and the resonant frequencies of the vocal tract of the sounds are evaluated for control purposes.

In detail, the two-dimensional control range illustrated in FIG. 6 is defined first of all, in that a user first of all utters a first vowel sound with a minimum to maximum frequency $f_{min}$ and $f_{max}$. The formant vector $F_1=(F_{1.1}, F_{1.2}, F_{1.3})^T$ is then calculated and stored for this vowel sound, which, for example, defines the horizontal axis in FIG. 6. The formant vector $F_2=(F_{2.1}, F_{2.2}, F_{2.3})^T$ for the second vowel sound is then determined in a corresponding manner and is likewise stored.

If a specific sound which is between these two vowel sounds and is at a specific frequency is now uttered for control purposes, then the voice signal, that is to say the output signal from the microphone 12 in the sound recognition circuit 14, is applied to a frequency recognition circuit 20, in order to determine the pitch frequency $f_p$ of the sound. The output signal representing the pitch frequency $f_p$ from the frequency recognition circuit 20 is passed to a logarithm-formation circuit 21, in order to determine the magnitude |log f| of the frequency vector.

The voice signal is also applied to a formant vector determination circuit 22, in order then to determine the formant vector $F=(F_1, F_2, F_3)^T$. The similarity S is then calculated by means of a similarity calculation circuit 23 in accordance with equation 1, taking into account the previously stored formant vectors $F_1$ and $F_2$. The output signal from the similarity calculation circuit 23, which corresponds to the similarity S and varies between −1 and +1, has the number 1 added to it in an adder circuit 24, so that a positive value S+1 is always present. The value S+1 is then multiplied by π/4 in the multiplier circuit 25 to calculate the angle α, which is between 0 and π/2.

The polar coordinates |log f| and α of the frequency vector log f are thus defined in the permitted two-dimensional logarithmic frequency domain. The Cartesian coordinates, if these are required, can be calculated in a known manner from the polar coordinates. It can then be said that: $\log f=(|\log f|\cdot\cos \alpha, |\log f|\cdot\sin \alpha)^T$, where a =π/4·S.

The use of voice sounds for control purposes using formants to calculate the frequency vector, that is to say to calculate the desired selected position in the logarithmic frequency domain, has the advantage that relatively accurate frequency and tonal quality recognition are still possible even in a relatively noisy environment, so that incorrect control actions resulting from environmental noise can be largely prevented.

What is claimed is:

1. Method for acoustically controlling an electronic device, in particular a mobile station in a mobile radio network, wherein first predetermined options and second predetermined options are respectively assigned to first and second voiced sounds;

the first predetermined options are sequentially assigned to an adjustable frequency range between a lowest frequency and highest frequency of the first voiced sound, whereas the second predetermined options are sequentially assigned to an adjustable frequency range between a lowest frequency and highest frequency of the second voiced sound; and an uttered sound is varied in the set frequency ranges and between the first and the second voiced sounds to select from the predetermined options.

2. Method according to claim 1 characterized in that various groups of predetermined options are assigned to different tonal qualities, while the individual options in each group are assigned to individual frequencies in a set frequency range, and that a group of predetermined options is first selected by varying the tonal quality, and the frequency of the sound is then varied in order to select an option from the selected group.

3. Method according to claim 1, characterized in that, in order to select one option from a plurality of two-dimensionally available options, the tonal quality and the frequency of the sound are varied at the same time.

4. Method according to claim 1, characterized in that the predetermined options are control commands, which are combined in groups into menus.

5. Method according to claim 1, characterized in that the predetermined options are data which are stored in list form.

6. Method according to claim 1, characterized in that the options to be selected are formed from adjustable and selectable values of one or more parameters for operation of the electronic device.

7. Method according to claim 6, characterized in that, when the selection is confirmed, the set frequency and/or tonal quality range are/is indicated by sounds or frequencies corresponding to their limit values, in addition to a confirmation sound.

8. Method according to claim 1, characterized in that successful selection of an option is confirmed by the electronic switching device repeating the sound which defines the selection.

9. Method according to claim 1, characterized in that successful selection is confirmed by indicating or announcing the selected option.

10. Method according to claim 1, characterized in that, first of all, a group of individual options is selected from a large number of options by sound variation, and in that the desired option is then selected on the basis of the selected group of options.

11. Method according to claim 10, characterized in that the selection of the desired option is carried out manually on the basis of the preselected group of options.

12. Method according to claim 1, characterized in that, in order to recognize a selection, the acoustic energy is first of all detected and is compared with a reference value in order to recognize a sound as such, and in that, after a sound has been recognized, its frequency and/or its tonal quality is defined, in order then to indicate or to announce the associated option as a function of this.

13. Method according to claim 12, characterized in that the frequency and/or the tonal quality of the sound are/is detected continuously, in order to display the predetermined options sequentially in accordance with the frequency change or tonal quality change, or to cause them to be indicated.

14. Method according to claim 1, characterized in that the frequency and/or tonal quality range is adjustable individually for each user.

15. Method according to claim 1, characterized in that a voice sound is used to select an option.

16. Method according to claim 15, characterized in that formant vectors are defined for the sound, in order to describe its tonal quality.

17. Method according to claim 15, characterized in that the similarity S of a current tonal response is calculated with two vowel sounds, previously defined by the user, using formant vectors by means of the following equation $$S = \frac{|F - F_1| - |F - F_2|}{|F - F_1| + |F - F_2|}$$

where F is the formant vector for the current tonal quality, $F_1$ and $F_2$ are the formant vectors respectively of the first and second vowel sounds defined by the user;

adding one to the value of S to produce a sum; and multiplying said sum by $\pi/4$ radians to produce a product $\alpha$.

* * * * *